March 10, 1964     L. LE FLEM ETAL     3,124,516
NUCLEAR REACTOR DUCT CLOSURE DEVICE
Filed May 2, 1960     4 Sheets-Sheet 4

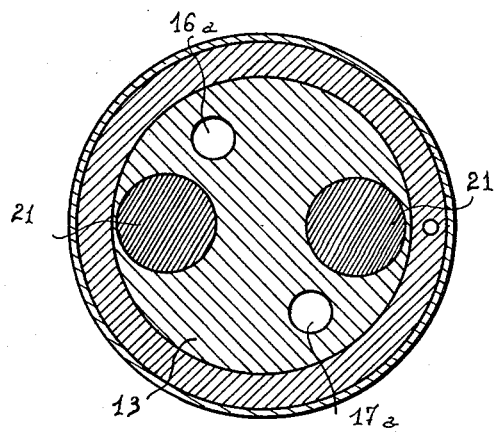
Fig. 2 bis

United States Patent Office 3,124,516
Patented Mar. 10, 1964

3,124,516
NUCLEAR REACTOR DUCT CLOSURE DEVICE
Leon Le Flem, Enghien-les-Bains, Daniel Voeltzel, Paris, and Jacques Jouin, Chaville, France, assignors to Commissariat a l'Energie Atomique, Paris, France
Filed May 2, 1960, Ser. No. 25,935
Claims priority, application France May 5, 1959
6 Claims. (Cl. 176—87)

This invention relates generally to nuclear reactors in which ducts extend into the irradiated zones of the reactor; the invention relates more particularly to a device for closing such ducts which enables loading or unloading to proceed while the reactor is in operation while maintaining the arrangements for radiological protection and, where applicable, for cooling of the duct by a fluid.

It is an object of the invention to provide a novel device for closing a duct of a nuclear reactor which offers improved radiological protection.

It is another and important object of the invention to provide a closure device comprising two axially aligned drums mounted for staggered rotation with respect to each other, each formed with axially directed ducts which are out of coincidence in normal (closed) position of the closure device, whereby radiological protection by the full thickness of at least one drum is provided in front of each duct.

The term "staggered rotation" just used means that, when the outer drum has rotated through an angle, the inner drum has also rotated, but through a different angle. This difference between the angles of drum rotation can be provided either continuously, for instance, by the drums rotating in predetermined ratios, or stepwise, for instance, by the outer drum initially rotating alone and only subsequently moving the inner drum with it.

In an advantageous embodiment of the invention, a single closure device comprising two drums is associated with a number of reactor ducts; the axes thereof are distributed, preferably regularly, over a right circular cylinder having its axis coincident with the common axis of the drums, and the number and angular position of the lengthwise ducts in each drum are so determined in dependence upon the law of relative rotation of the two drums that, when the closure device is in the fully closed position, each reactor duct is in alignment with the solid part of at least one drum, and when any reactor duct is in simultaneous alignment with two lengthwise ducts of the two drums, all the other reactor ducts are preferably in alignment with the solid part of at least one drum.

As already stated, such a closure device keeps closed the radiological protection devices for all the reactor ducts. Where one such closure device is associated with a number of ducts, such device keeps closed the radiological protection devices for all the ducts except the duct which is being loaded or unloaded. Also, additional means can readily be provided for sealing the ducts in the outer drum with respect to the atmosphere as long as the closure device is in closed condition.

That duct of the outer drum which is in the open position can be connected to an outer sealing-tight enclosed chamber from which the operations associated with the corresponding reactor duct can be performed.

The invention will in any case be readily understood from the following description, given by way of example only, of two embodiments thereof, reference being made to the accompanying drawings wherein.

Figure 1:
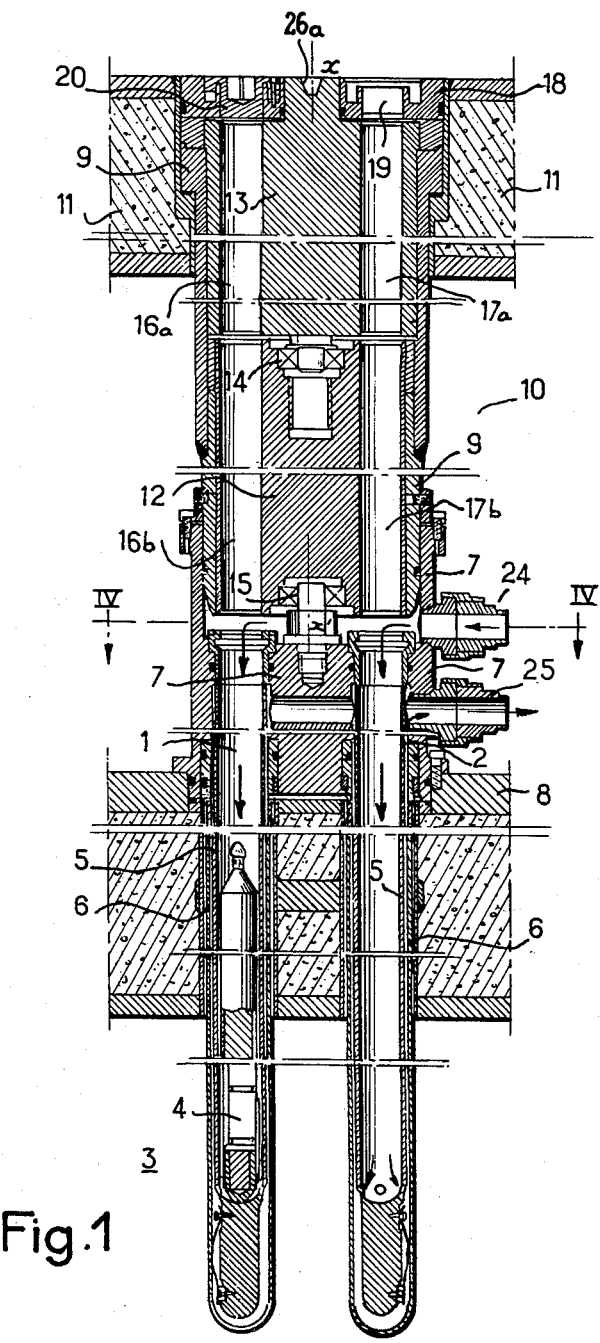
FIGURE 1 is a view in longitudinal section of the first embodiment, being a device for closing two vertical ducts of a carbon-dioxide-cooled nuclear reactor, with the drums in "open" angular position.
Figure 2:
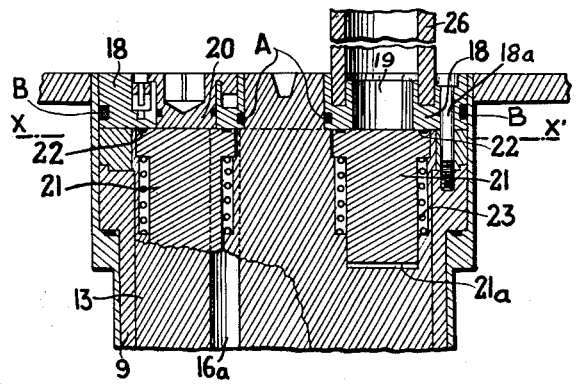
FIGURE 2 is a partial view in longitudinal section showing the top of the same device in the closed position, with the outer drum in "closed" angular position, rotated 120° from the position of FIG. 1.
Figures 3, 5:
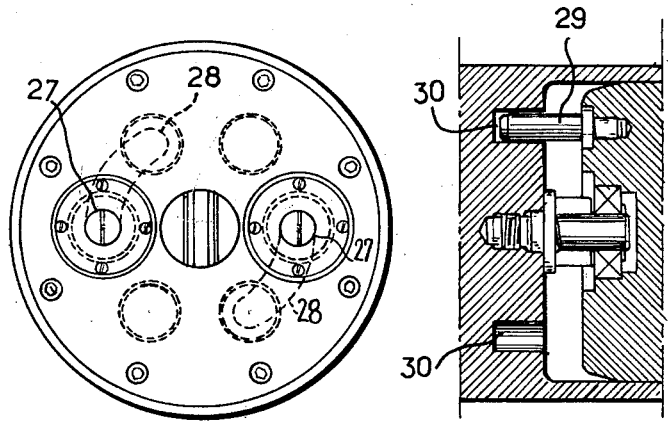
Figure 4:
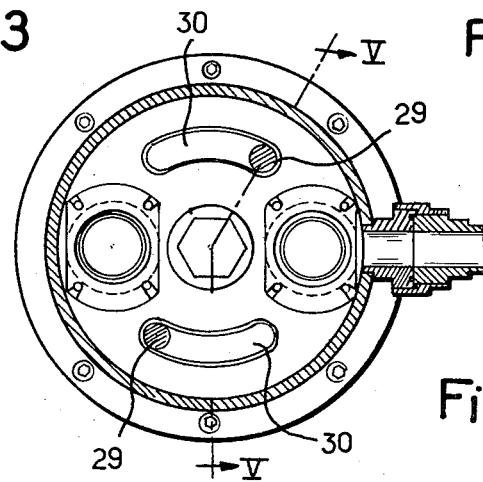
Figure 6:
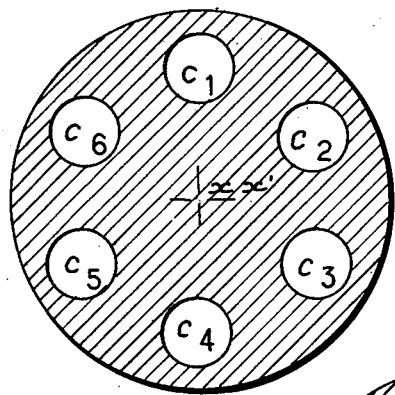
Figure 8:
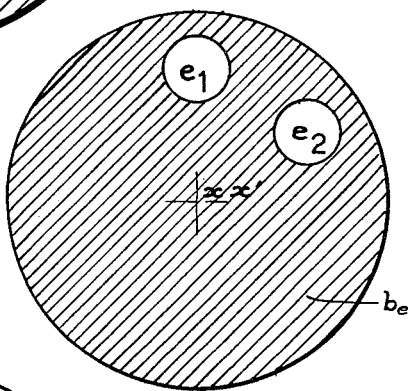
Figure 7:
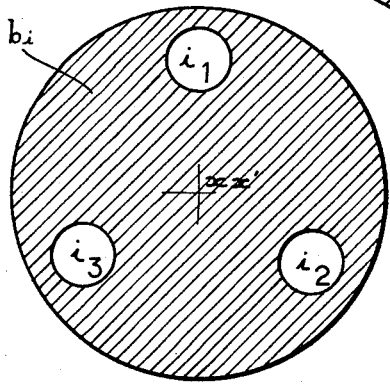
Figure 9:
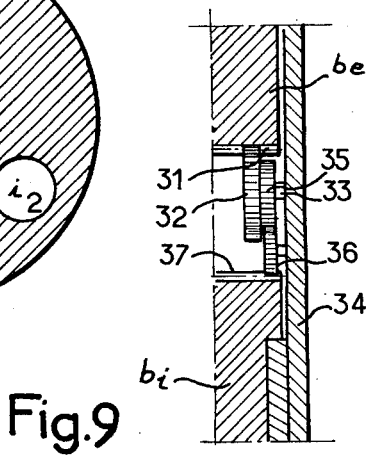

FIGURE 2 bis is a sectional view on the line $x$—$x'$ of FIG. 2;

FIGURE 3 is a plan view of the device in the position shown in FIGURE 2;

FIGURE 4 is a view taken along the section line IV—IV of FIGURE 1;

FIGURE 5 is a view taken along the section line V—V of FIGURE 4;

FIGURE 6 is a diagrammatic plan view of another embodiment showing six reactor ducts arranged for cooperation with a single two-drum closure device constituting the second embodiment;

FIGURE 7 is a diagrammatic plan view of the inner drum of the device shown in FIGURE 6;

FIGURE 8 is a diagrammatic plan view of the outer drum of the device shown in FIGURE 6; and FIGURE 9 is a view of details showing the means for relative rotation, such means being disposed between the two drums of the device shown in FIGURE 6.

The example chosen and illustrated in FIGURES 1–5 is for a nuclear reactor formed with a number of vertical ducts, as 1 and 2 (FIGURE 1), which extend from the external surface of the reactor into a reactor reflector 3 and which are used to irradiate samples placed in racks 4. For introduction or removal of the racks 4, the closure device is first opened and then a handling cage provided with grippers is connected to the device. As will be seen later, there is no need to stop the reactor for this operation.

Each duct contains two concentric aluminium sleeves 5, 6, and the sleeves corresponding to two associated ducts, as 1 and 2, are rigidly secured to a base 7 secured to a frame 8. Secured to the base 7 is a sealing-tight sheath 9 which extends through a top chamber 10 above the reactor and through a radiological protection block 11. Two drums—an inner drum 12 and an outer drum 13 coaxial therewith—are disposed inside the sheath 9 and are adapted to rotate around a common axis $x$—$x'$ and relatively to one another. The outer drum 13 rests on a conical-roller bearing 14 borne by the inner drum 12 which rests on another roller bearing 15 borne by the base 7. Each drum is made of cast iron and is formed with two lengthwise ducts 16a, 17a and 16b, 17b which are disposed at the same axial separation as the ducts 1 and 2 and which are wide enough for a rack 4 to pass through.

A stationary closure plate 18 is provided at the top of the reactor assembly for supporting the handling cage and is secured to the sheath by suitable means, such as bolts 18a, one of which is shown in FIG. 2. Closure plate 18 is formed with apertures 19 located in axial alignment with the ducts 1, 2 and are closed by sealing-tight plugs 20, one of which is shown in FIGS. 1 and 2. When the device is in the closed position as shown in FIGURE 2, additional sealing is provided through the agency of a moving member 21 provided with an annular packing 22, the member 21 being received in the outer drum 13 and being urged against the closure plate 18 by a spring 23.

In the example illustrated in the drawings, the racks 4 are cooled by carbon dioxide gas which is supplied through a pipe 24, descends through the inner sleeve 5 to cool the racks 4 and then rises through the annular gap between the sleeves 5, 6 and leaves the reactor through a pipe 25. Consequently, the pressure of the carbon dioxide rising in the lengthwise ducts 16a, 16b, 17a, 17b of the drums 12, 13 is operative upon the bottom surface 21a of the moving sealing members 21, as can be seen in FIGURE 2. In the position of drum 13 shown in FIG. 2, a fluid seal from the interior toward the exterior is provided by packings 22 located on the upper part of member 21. These packings are pressed onto the lower face of member 18 by means of springs 23 and by the pressure of the cooling gas which leaves canals 16a and 17a and circulates between drum 13 and closure plate 18. Sealing between plate 18 and the exterior is provided by annular seals A and B of FIG. 2 which are disposed between plate 18 and drum 13 and between plate 18 and the exterior sheath of the device. The cooling gas cannot escape through orifices 19 even when they are opened by removal of plugs 20 because of joints 22. The gas enters the recesses in which members 21 are mounted and acts on the shoulders and interior faces of these members tending to lift them up thus increasing the seal between drum 13 and closure plate 18 in the neighborhood of orifices 19.

When a duct is loaded or unloaded, radiological protection must be provided, there must be no carbon dioxide leakage, and the rack must be permanently cooled. These conditions are met by using a sealing-tight cage and through the agency of the double-drum closure device hereinbefore described. The cage forms no part of the invention and no description thereof is deemed necessary. To unload a rack the following procedure is used:

The plug 20 in the duct to be unloaded is removed, sealing-tightness being provided by the annular packing 22 which is applied to the plate 18 by the member 21. The cage is positioned, a sealing tube 26 for the cage is lowered and introduced, for instance, into the aperture from which the plug 20 has been withdrawn, as can be seen on the right-hand side of FIGURE 2. It is obvious that the sealing tube will isolate the cage from the atmosphere. The outer drum 13 is rotated by mechanical means (not shown) which engages an irregularly shaped hole 26a in the outer drum. After the drum 13 has rotated through 60°, each of two fingers 27 on the base thereof (FIGURE 3) engages with the edge of an arcuate recess 28 in the top surface of the inner drum, whereafter the same is moved as the outer drum rotates through a further 60°. The inner and outer drums are stopped by a finger 29 on the base of the inner drum (see FIGURES 4 and 5), the finger 29 moving in an arcuate recess 30 in the base 7. The lengthwise ducts 16a and 16b, and 17a and 17b of the two drums are then in alignment with the ducts 1, 2 respectively and grippers can be lowered to remove the rack 4 in the duct 1 or 2 above which the sealing tube 26 has been placed. The drums are returned to their initial positions by rotation in the reverse direction.

Referring now to FIGURES 6–9, it will be apparent that the principle of the closure device hereinbefore described can be used with advantage to provide control of the closure of a large number of ducts by means of a single device.

For instance, FIGURE 6 is a diagrammatic plan view showing six vertical ducts $C_1$, $C_2$ . . . $C_6$ distributed evenly around the axis $x$—$x'$ of two drums—an inner drum $b_i$ and an outer drum $b_e$ (FIG. 9).

FIGURE 7 is a diagrammatic plan view showing the inner drum $b_i$ formed with three lengthwise ducts $i_1$, $i_2$, $i_3$ distributed evenly around the axis $x$—$x'$.

FIGURE 8 is a diagrammatic plan view showing the outer drum $b_e$ formed with two lengthwise ducts $e_1$, $e_2$ which are offset from one another by 60° and which are disposed at the same distance from the axis $x$—$x'$ as the ducts $C_1$, $C_2$ . . . $C_6$, $i_1$, $i_2$, $i_3$.

The number and angular position of the various ducts $i_1$, $i_2$, $i_3$, $e_1$, $e_2$ are so chosen that the outer drum $b_e$ when rotated rotates the inner drum $b_i$ in the same direction and at half the speed.

One way of doing this is shown by way of example in FIGURE 9. The periphery of the base of the outer drum $b_e$ comprises a toothed ring 31 with which engage a plurality of pinions 32 mounted loose on spindles 33 distributed over the periphery of a sheath 34. The pinions 32 are rigidly secured to pinions 35 which are half the diameter of the pinions 32 and which drive pinions 36; the same are of the same diameter as the pinions 35 and engage with a toothed ring 37 on the periphery of the top surface of the inner drum $b_i$.

The drums $b_e$, $b_i$ and the ducts $C_1$ to $C_6$ are so offset from one another that the ducts $C_1$, $i_1$, $e_1$ are in alignment in an initial position. Only the duct $C_1$ is then accessible, since the other ducts $C_2$ to $C_6$ are in alignment with the solid part of at least one of the two drums $b_e$, $b_i$.

If the outer drum $b_e$ is then given consecutive clockwise rotations of 120° each associated with 60° rotations in the same direction of the inner drum $b_i$, the various ducts will be opened seriatim in the manner shown in the following table:

| Angular positions of the various lengthwise ducts, degrees | | | | | Duct open |
|---|---|---|---|---|---|
| Outer drum | | Inner drum | | | |
| $e_1$ | $e_2$ | $i_1$ | $i_2$ | $i_3$ | |
| 0 | 60 | 0 | 120 | 240 | $C_1$ |
| 120 | 180 | 60 | 180 | 300 | $C_4$ |
| 240 | 300 | 120 | 240 | 0 | $C_5$ |
| 0 | 60 | 180 | 300 | 60 | $C_2$ |
| 120 | 180 | 240 | 0 | 120 | $C_3$ |
| 240 | 300 | 300 | 60 | 180 | $C_6$ |

Of course, to close all the ducts simultaneously the outer drum $b_e$ is rotated by 60°, and the inner drum by 30°, from any position of the outer drum $b_e$ in which one of the ducts $C_1$ to $C_6$ is open. All the ducts $C_1$ to $C_6$ will then be in alignment with solid parts of the two drums $b_e$, $b_i$.

We claim:

1. In a nuclear reactor duct closure device for at least one duct of a nuclear reactor having a radiological shield, a sheath passing through the radiological shield eccentric with respect to the duct, a first outer drum mounted in said sheath in the longitudinal axis thereof, a second interior drum mounted beneath said first drum in said sheath, the longitudinal axes of said drums being coaxial with the longitudinal axis of said sheath, at least one canal passing longitudinally through each of said drums and parallel and eccentric with respect to the longitudinal axis of said drum, means for rotating said first drum angularly with respect to said sheath from a first angular position to a second angular position in which said canal of said first drum forms a prolongation of the duct of the reactor, second means for rotating said second drum angularly with respect to said sheath from a first angular position to a second angular position in which said canal of said second drum forms a prolongation of the duct of the reactor and of said canal of said first drum and means for limiting the angular rotation of said second drum, said drums providing in their initial angular positions a closure for the duct of the reactor and radiological protection for the reactor toward its surface.

2. Apparatus as described in claim 1 in which said second means include a finger fixed to the lower surface of said first drum and a slot in the upper face of said second drum so constructed and arranged that said first drum moves freely during the first part of its rotation and said finger rotates said second drum during the second part of the rotation of said first drum.

3. Apparatus as described in claim 1, said second means comprising pinions connecting said drums whereby rotation of said first drum rotates said second drum according to the ratio of said pinions.

4. Apparatus as described in claim 1, said drums closing a plurality of ducts of the reactor, the ducts of the reactor being parallel and evenly spaced about a circumference having its axis coincident with the axis of said drums.

5. Apparatus as described in claim 1, the number and angular position of said canals in each of said drums depend upon the relative rotation of said drums whereby, when the closure device is in closed position, each duct in the reactor is in alignment with a solid part of at least one of said drums.

6. Apparatus as described in claim 1 in which the remaining reactor ducts are aligned with a solid part of at least one of said drums when a reactor duct is aligned with two aligned canals of said drums.

References Cited in the file of this patent

UNITED STATES PATENTS

| 142,175 | Philip | Aug. 26, 1873 |
| 148,742 | Orr | Mar. 17, 1874 |

OTHER REFERENCES

Parkins: Proceedings of the International Conference on the Peaceful Uses of Atomic Energy, volume 3, 1955, pages 309–311, New York.

Fryar: Proceedings of the Second United Nations Conference on the Peaceful Uses of Atomic Energy, volume 9, 1958, pages 228–229, Geneva.